June 13, 1961     W. E. LEAVITT     2,988,695
ELECTRICAL MEASURING CIRCUIT
Filed Nov. 30, 1956     3 Sheets-Sheet 3
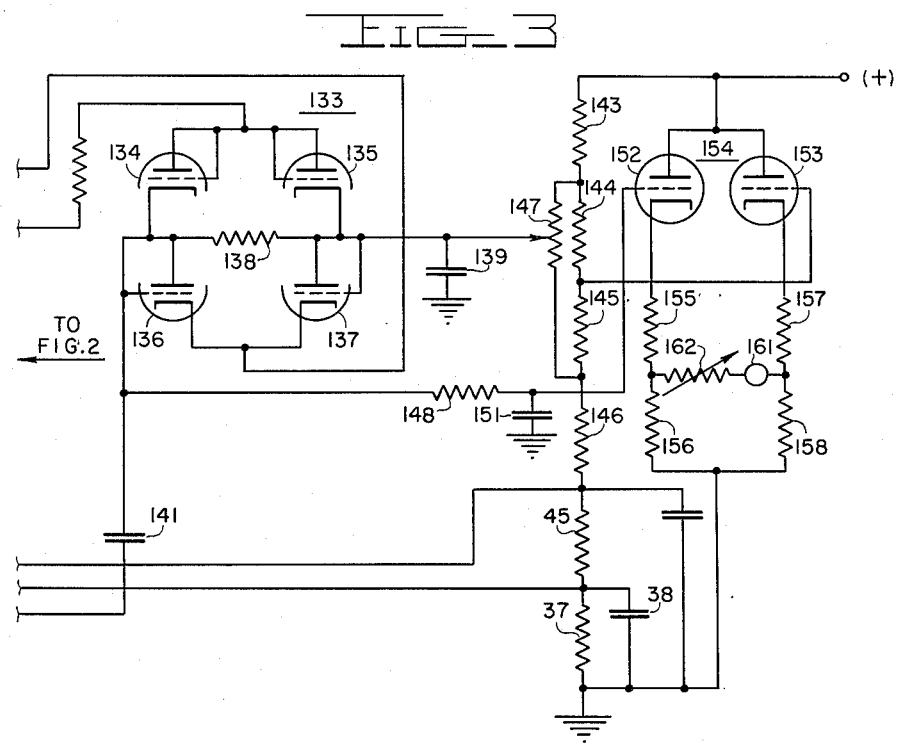
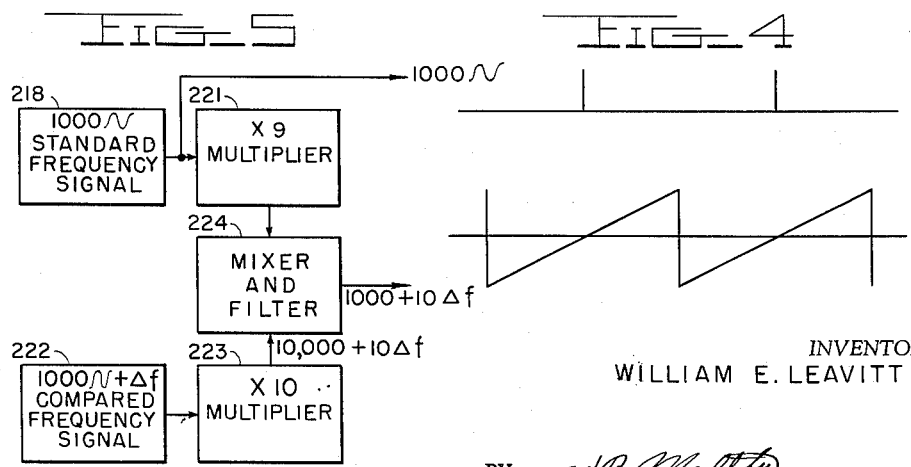
INVENTOR
WILLIAM E. LEAVITT United States Patent Office 2,988,695
Patented June 13, 1961

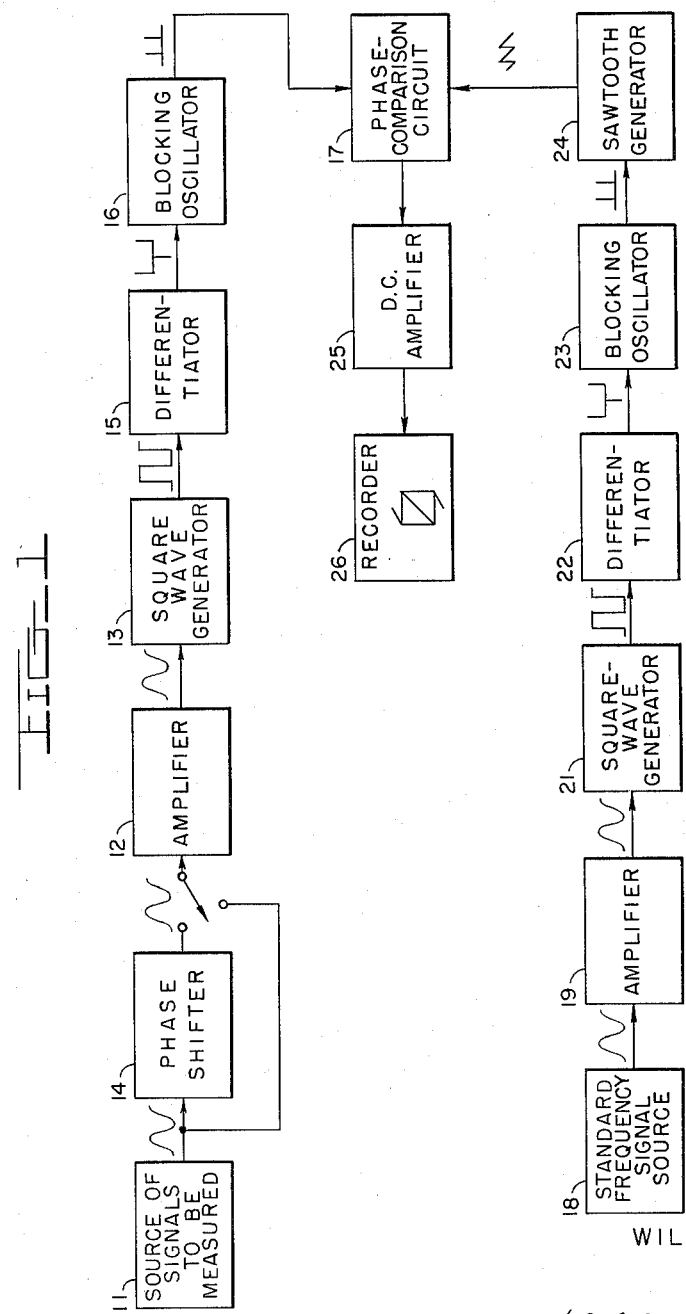

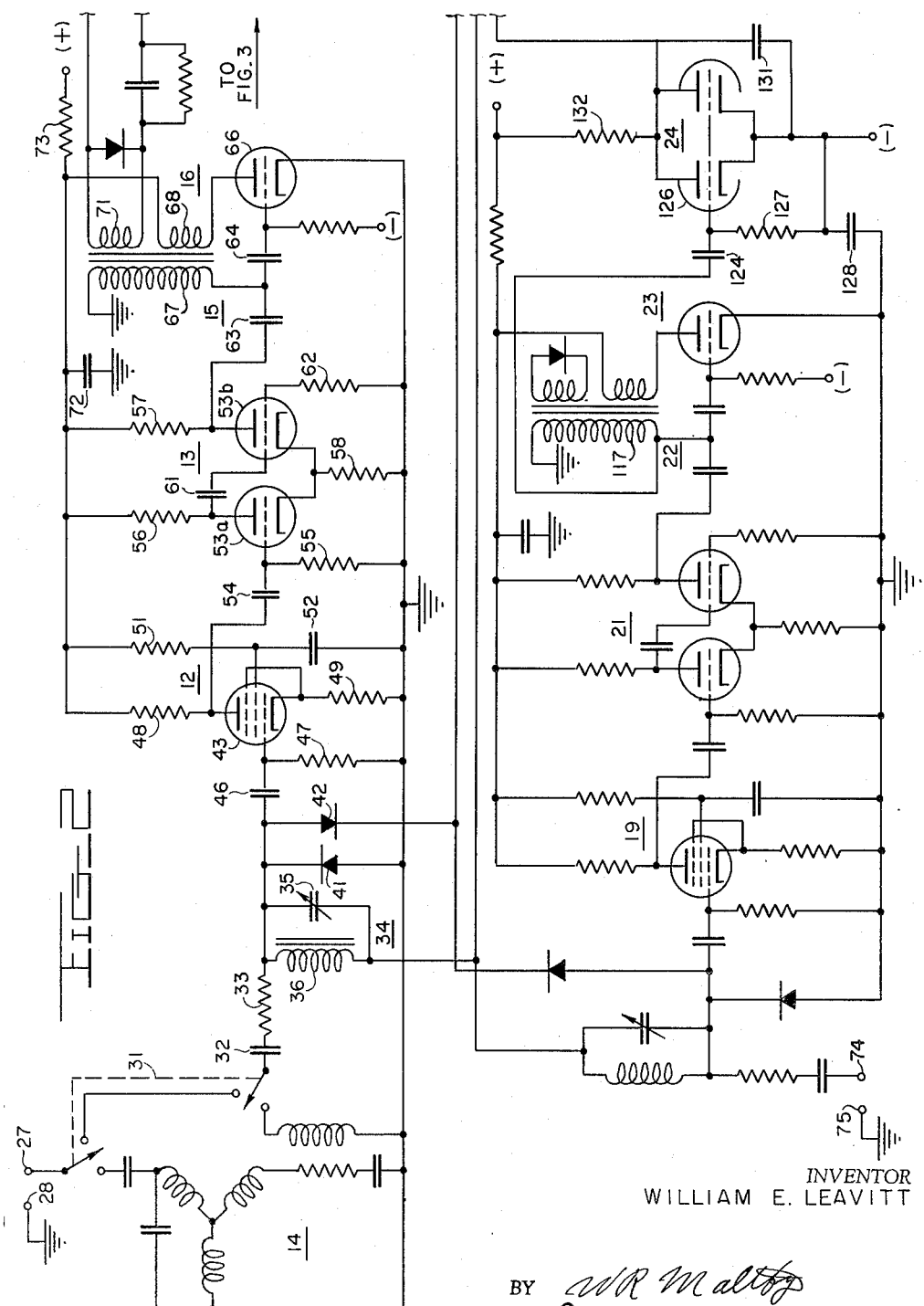

2,988,695
ELECTRICAL MEASURING CIRCUIT
William E. Leavitt, Temple Hills, Md., assignor to the United States of America as represented by the Secretary of the Navy
Filed Nov. 30, 1956, Ser. No. 625,560
3 Claims. (Cl. 324—82)
(Granted under Title 35, U.S. Code (1952), sec. 266)

The invention described herein may be manufactured and used by or for the Government of the United States of America for governmental purposes without the payment of any royalties thereon or therefor.

This invention relates to electrical measuring circuits and more particularly to such circuits for measuring the frequency and variation of frequency of recurrent wave energy.

Various frequency comparison devices are known in which two signals, one the signal to be compared and the other a standard reference signal, are fed into a mixer which produces a beat frequency signal having a frequency equal to the differences in frequency between the two signals. This beat signal is then shaped and fed to some type of pulse frequency converter which produces an output proportional to the difference in frequency between the signal to be compared and the frequency of the standard signal. Other circuits use frequency multipliers and dividers to bring the frequencies of the two signals to values which are nearly equal, or to multiply or divide the frequency deviations. In all of these circuits however, the energy required to indicate the frequency difference between the frequencies is derived from the signals produced when the two signals are beat together in a mixer. Since the mixer produces a signal which has a frequency equal to the difference between the frequency of the signal to be compared and the frequency of the reference signal, such an arrangement is perfectly satisfactory for comparing the frequency of signals which have relatively large frequency differences. However, if the frequency difference is very small, for example, if two oscillators running at 1000 c.p.s. are to be compared and one produces just one more cycle in a twelve hour period than the other, it is obvious that it would be difficult to indicate or measure such a small frequency deviation with these devices.

The present invention seeks to remedy this defect and to provide a high precision frequency measuring system in which an "alternating current" reference signal is applied to a suitable system which produces a sawtooth wave of the same frequency as the reference signal. The signal to be compared is applied to a suitable electronic system which produces a series of pulses having a repetition rate equal to the frequency of the signal to be compared. The sawtooth wave and the pulses are then applied to a phase comparison circuit which produces a pulsating "direct current" output which is directly proportional in amplitude to the phase relationship between the sawtooth and the pulses. This pulsating D.C. voltage is then smoothed by suitable filters and used to drive a recording instrument. Since the sawtooth wave has the same frequency as the reference signal and the pulse repetition rate of the pulses produced by the electronic circuitry is the same as the frequency of the signal to be compared, the D.C. output is proportional to the phase difference between the reference signal and the compared signal. The different values of the D.C. output will, in time, trace out a sawtooth waveform which indicates that the compared signal either leads or lags the reference signal by one cycle. The frequency difference between the compared and the reference frequency can then be determined by taking the reciprocal of this time in seconds, thus giving a frequency difference in cycles per second, and the frequency of the compared signal can be determined by merely adding or subtracting this frequency difference to or from the reference signal frequency. Thus, if it takes hours or even days for the sawtooth waveform to be traced out, a determination as to the difference in frequency of the signal to be compared and the frequency of the reference signal can be made.

An object of the present invention is the provision of an electrical measuring circuit for measuring the frequency and variation of frequency of recurrent wave energy.

Another object is to provide a high precision frequency measuring circuit which is capable of measuring extremely small differences in frequency between two signals.

A further object of the invention is the provision of a high precision frequency measuring system for measuring the frequency difference between two signals in which the output from the system at any given instant of time is directly proportional to the phase difference between the two signals.

Still another object of the invention is the provision of a high precision electronic chronograph which is capable of measuring small accumulated time differences between precision clocks.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows a block diagram of the basic components of the invention;

FIG. 2 shows a circuit diagram of a portion of a preferred embodiment of the invention;

FIG. 3 shows the remainder of the circuit diagram of a preferred embodiment of the invention;

FIG. 4 shows the pulses and sawtooth waveform applied to a phase comparison circuit; and FIG. 5 shows a block diagram of a frequency error multiplier which can be used with the invention.

Referring now to FIG. 1, there is shown a source of signals to be measured 11, the signals from which are fed to an amplifier 12 which amplifies the signal before it is applied to a square wave generator 13. The function of the phase shifter 14 will be explained later in the specification. The square wave output from the square wave generator 13 is then applied to a suitable differentiator network 15 which produces positive and negative peaked pulses, which in turn are used to trigger a blocking oscillator 16. This blocking oscillator produces sharp peaked positive pulses which are applied to a phase comparison circuit 17.

A standard or reference frequency signal source 18 is connected to an amplifier 19, and the amplified signal is in turn fed to a square wave generator 21. The square waves produced are applied to a differentiator 22, then fed to a blocking oscillator 23 which produces positive peaked pulses for use in driving a sawtooth generator 24. The positive peaked pulses from the blocking oscillator 16 and the sawtooth wave from the sawtooth generator 24 are then applied to a phase comparison circuit 17 which produces a direct current output which is directly proportional to the phase difference between the sawtooth waveform from the sawtooth generator 24 and the positive pulses from the blocking oscillator 16. The corresponding components which operate on the two signals are made similar to each other, that is amplifiers 12 and 19, square wave generators 13 and 21, differentiators 15 and 22, and blocking oscillators 16 and 23, so that the pulse repetition rate of the blocking oscillator 16 is the same as the frequency of the signals from the source 11, and the frequency of the sawtooth generator 24 is the same as the frequency of the signals from the standard source 11. Since this is true, it follows that the phase comparison circuit produces a D.C. output which is proportional to the phase difference between the signals to be measured and the standard frequency signals. The D.C. output from the phase comparison circuit 17 is then fed to a D.C. amplifier 25, and this amplified D.C. output may then be fed to a recorder 26. The phase comparison circuit 17 produces, for each 360° phase shift between the two signals, a sawtooth waveform similar to that produced by the sawtooth wave generator 24. It can be thought of as a switch in which the pulses from the blocking oscillator 16 turn the circuit 17 on and off so to speak, to allow the potential of the sawtooth wave from the generator 24 to reach the D.C. amplifier at each point in time when a pulse is received from the blocking oscillator 16. As the phase angle changes between the two signals a sawtooth waveform will be reproduced and the time that it takes to reproduce the wave is the reciprocal of the frequency difference between the signals from the source 11 and the frequency from the standard source 18.

The recorder 26 may be used to record the D.C. output of the amplifier 25 and as can be seen by reference to FIG. 1, a typical recorder will record this output and produce the sawtooth waveform. The recorder will of course run at a certain speed, from which can be calculated the length of time which elapses in tracing out a complete sawtooth wave; the reciprocal of this time being the frequency difference between the signals from the source to be measured 11, and the frequency of standard source 18. Knowing the difference between the two signals, the frequency of the signal to be measured can be determined by merely adding or subtracting this frequency difference to or from the frequency of the standard signal.

In FIGS. 2 and 3 there is shown, by way of example only and in order to provide clear understanding and appreciation of the present invention, a circuit diagram of apparatus embodying the invention and particularly suitable for measuring the time deviation between a precision clock and a reference precision clock.

The signal to be compared, ordinarily any sinusoidal waveform, for example from a piezoelectric crystal frequency standard is applied between an input terminal 27 and a grounded input terminal 28. Under ordinary operating conditions, the phase shifter circuit 14 is bypassed by means of a gang switch 31 and the signal passes through a blocking capacitor 32 and a resistance 33. A parallel resonant circuit 34 composed of a variable capacitor 35 and an inductor 36 is provided to resonate at the frequency of the signal to be compared, as nearly as this value can be estimated prior to measurement. It is well known that at the resonant frequency, a parallel resonant circuit provides a maximum impedance, and this principle is used here to provide a high impedance path to ground for the signal applied. As can be seen by reference to FIG. 3, the parallel resonant circuit is grounded through a resistor 37 and a condenser 38. Two limiters 41 and 42 which may be any unidirectional current device but are preferably of the crystal rectifier type, are used to limit the signal and produce a waveshape that is fairly square in appearance. Such limiters are desirable to prevent the pentode amplifier 43 from being overdriven, which could possible produce a nonsymmetrical output and cause a time error in the generation of pulses by the square-wave generator 13, since the pulses produced are generated at a point of zero voltage. The bias for diode 41 is provided by the resistor 37, and the bias for diode 42 is provided by the resistor 45 (see FIG. 3). In this biasing arrangement, the diode 41 limits the negative portion of the input signal and the diode 42 limits the positive portion of the input signal.

This limited signal is then applied to the grid of the tube 43, a component of the amplifier 12, through a capacitor 46 and a grid resistor 47. The tube 43 has a plate load resistance 48, a screen dropping resistor 51, a screen bypass condenser 52, and a cathode resistance 49. The amplified signal produced at the plate of the tube 43 is applied to the square wave generator 13 which typically is a two stage clipper-amplifier including the triode electron tubes 53–a and 53–b. The square wave generator 13 produces a square wave output of the same frequency as the signal to be compared. The square wave output is applied to condenser 63 which together with the grid winding 67 comprises the differentiating circuit 15. The positive peaked pulses produced by the differentiating circuit 15 are applied through a capacitor 64 to trigger blocking oscillator 16 comprised of a triode 66 and a transformer having three windings, a grid winding 67, a plate winding 68 and an output winding 71. Thus there is produced across the output winding 71 a train of peaked positive pulses having a pulse repetition rate equal to the frequency of the signal to be compared. The grid of the triode is biased to a predetermined negative potential, for example −30 volts which maintains tube 66 cut-off to be rendered conductive only by the positive peaks of the differentiated signals. A condenser 72 and a resistor 73 provide additional filtering for the plate supplies of the amplifier and the square wave generator.

A reference signal of standard frequency is applied between the input terminals 74 and 75 of an electronic circuit system which, except for the absence of the phase shifter 14, is identical to that described above. This is readily apparent from an inspection of FIG. 2, and a description of the circuit except as it departs from that described above is considered unnecessary.

Referring now to the blocking oscillator 23, it can be seen that the output which is in the form of a series of peaked positive pulses is taken from the base of the grid winding 117 and is fed through a coupling capacitor 124 to the grid of a sawtooth generator generally designated by the numeral 24. The sawtooth generator consists of a twin triode 126 such as a 6AS7 tube connected in parallel, a grid resistance 127, a by-pass capacitor 128, and a condenser 131 charged through the resistor 132. As the positive pulses from the blocking oscillator are applied to the grid of the tube 126, the condenser 131 discharges through the tube 126, then charges in the interval before the next pulse arrives thus producing a sawtooth wave.

The by-pass condenser 128 is placed in the circuit to provide a low impedance path to ground for the high frequency components of the sawtooth and to provide high frequency by-passing for the power supply.

In order to achieve a good degree of accuracy, it is necessary that the pulses from the blocking oscillators 16 and 23 and the flyback time of the sawtooth wave produced by the sawtooth generator be negligible compared to the period of the sawtooth generated. If, for example, the period of the sawtooth is one millisecond as described above, it has been found that the blocking oscillator should have a pulse width of approximately one microsecond and therefore the flyback time of sawtooth will be one microsecond. In order for the sawtooth waveform to have sufficient amplitude the condenser 131 must be discharged through a resistance of very low value. Thus, a tube of low plate resistance, such as a 6AS7 is provided for the sawtooth wave generator. Although no error is introduced in the calculations because of a large flyback time when the time for one complete sawtooth is taken to compute frequency differences, if one wishes to use a shorter period of time and to measure from one point on one sawtooth to a different point on another sawtooth the flyback time will introduce an error, therefore the flyback time must be made negligible in comparison with the rest of the sawtooth.

Referring now to FIG. 3, there is shown a mixing or phase comparison circuit generally designated by the numeral 133 comprising four triodes, connected as diodes 134, 135, 136 and 137 and a large resistor 138. Such a connection including diode connected triodes provides improved operation over the more conventional diodes because the triodes were found to be more stable in operation, that is, the current produced by the triodes connected as diodes was more constant than that produced by conventional diodes, especially when the tubes were in a standby or unpulsed condition.

The plates and grids of the triodes 134 and 135 are tied together, while the cathode of tube 134 is connected to one side of the resistor 138, and the cathode of the tube 135 is connected to the opposite side of the resistor. Conversely, the cathodes of tubes 136 and 137 are tied together while the plate and grid of tube 136 are connected to one side of the resistor 138 and the plate and grid of tube 137 are connected to the other side of the resistor 138. The positive pulses from the blocking oscillator 16 are applied across the plates of the tubes 134 and 135, and the cathodes of tubes 136 and 137. This causes all four tubes to conduct during the duration of each pulse, which in turn causes the potential at both ends of the resistor 138 to become equal. The end of the resistance 138 which is connected to tubes 135 and 137 is connected to ground through a low resistive path comprising potentiometer 147, resistor 146, resistor 45 and resistor 37, all by-passed by a capacitor 139.

The sawtooth waveform from the sawtooth generator 24 is applied to the resistor 138 through a coupling capacitor 141. Assuming that the reference signal is applied to input terminals 74 and 75, but that the signal to be compared is switched out of the circuit or has not yet been applied to input terminals 26 and 28, the sawtooth wave from the sawtooth generator 24 will be passed by the condenser 141, and the condenser will carry no charge. When the signal to be compared is applied to the terminals 26 and 28 or is switched into the circuit, the blocking oscillator will pulse the tubes 134, 135, 136 and 137 and when a pulse is applied, the upper plate of the capacitor 141 is grounded through the tubes and the low impedance path previously mentioned while the lower plate of the capacitor carries the sawtooth waveform voltage at that instant. The capacitor will then charge through the low resistance path, resistors 37, 45, 146, and potentiometer 147, and the tubes to the point where the voltage across the capacitor equals the voltage of the sawtooth waveform. When the pulse terminates the voltage will remain substantially constant across the capacitor, as the charge can drain off only through the large resistor 138; however, a small voltage drop will be experienced, but the next pulse from the blocking oscillator 16 will again charge the capacitor to the value of the sawtooth wave voltage. Thus, the capacitor 141 carries a direct current voltage equal to the value of the sawtooth at any given instant plus the sawtooth waveform voltage which varies around the D.C. voltage. This varying D.C. voltage is then smoothed by a filter comprising a resistor 148 and a condenser 151 which eliminates the sawtooth waveform and leaves only the D.C. voltage to be applied to the grid of a triode 152 which together with triode 153 comprises a D.C. amplifier 154.

The cathodes of two triodes 152 and 153 are connected to ground through cathode resistors 155, 156, 157 and 158. The recorder 26 of FIG. 1 is connected to output terminals 161 which are effectively tapped down on the cathodes as shown to increase the stability of the tubes 152 and 153 by providing cathode degeneration through the resistors 155 and 157 respectively. An adjustable resistor 162 is provided to adjust the output voltage.

Proper negative bias for the tubes 152 and 153 is provided by the voltage divider network composed of resistors 143, 144, 145, 146, 45, 37 and potentiometer 147, together with the resistors 155, 156, 157 and 158. The bias on the tube 152 is adjusted by means of potentiometer 147 so that the conduction through the two tubes is equal in the absence of any signal on the grid of tube 152. The resistor 155 is made equal to resistor 157 and the resistor 156 is made equal to resistor 158, thus in the absence of a signal on the grid of tube 152 the voltage output at the output 161 is zero, but when a D.C. voltage is applied to the grid of tube 152, the conduction through the tube will increase or decrease depending upon the polarity of the D.C. signal. An output voltage at 161 will be developed through the cathode resistors which is proportional to the D.C. signal applied to the grid.

As explained previously, the pulse repitition rate of the blocking oscillator 16 is equal to the frequency of the signal to be compared, and the frequency of the sawtooth wave from sawtooth generator 24 is equal to the frequency of the reference signal. If the signal to be compared has exactly the same frequency as the reference signal, the output voltage at the recorder output will remain constant and if the pulse occurs at the time the sawtooth passes through zero as it is increasing, the output will be zero. Assuming that a pulse occurs at the time the sawtooth passes through zero as shown in FIG. 4 and that the frequency of the signal to be compared is less than the frequency of the reference signal, the length of time between pulses will be greater than the period of the sawtooth, and each succeeding pulse will be moved to the right and the voltage developed across capacitor 141 and applied to the grid of tube 152 will increase until the point is reached where the sawtooth flies back. At this instant, the voltage will then go negative and immediately start to increase again along the sawtooth waveform. Thus the D.C. signal applied to the grid of tube 152 will, over a period of time, trace out a sawtooth wave and since the output at output terminals 161 is proportional to the applied D.C. signal at the grid of tube 152, the output voltage will, over a given period of time, trace out a sawtooth waveform. Similarly, if the frequency of the signal to be compared is less than the reference signal, and a starting condition is taken where a pulse coincides with the point of zero amplitude of the sawtooth, the pulses will move to the left in FIG. 4 and an increasing negative potential will appear at the output terminals 161 until the point where the sawtooth flyback is reached. At this point, the potential will jump to a positive quantity and then progressively decrease until the next flyback is reached. This potential will also trace out a sawtooth waveform at the output terminals 161.

In either case, the voltage developed at the output terminals 161 is proportional to the phase difference between the pulses and the sawtooth and hence proportional to the phase difference between the signal to be compared and the reference signal.

With the recorder 26 connected to the output terminals 161 to continuously plot the voltage developed as a function of time, a sawtooth waveform will be plotted as the relative phasing of the signals from sources 11 and 18 changes from 0 to 360° the result being a sawtooth waveform having a period which is the reciprocal of the frequency difference between the signal to be compared and the frequency of the reference signal. To get the frequency of the signal to be compared, it is necessary to add or subtract this frequency difference to or from the known frequency of the reference signal. Whether the frequency difference is to be added or subtracted depends upon the direction of the polarity change at the time the pulses reach the flyback of the sawtooth. If the change is from negative to positive, the frequency difference must be added to get the frequency of the signal to be compared, and conversely if the change is from positive to negative, the frequency difference must be subtracted to get the frequency of the signal to be compared.

As mentioned previously, the circuit shown in FIGS. 2 and 3 is particularly useful in comparing a precision clock with a reference precision clock in which the difference between the two may amount to no more than a millisecond over a twelve hour period. If, for example, a 1000 cycle reference signal from a reference clock is applied to the input terminals 74 and 75, and a 1000 cycle signal from a clock to be compared is applied to the input terminals 26 and 28, one complete sawtooth waveform will be traced out by the phase comparison circuit 133 and will appear amplified at the D.C. output 161 each time there is a one millisecond difference between the two clocks. A recorder can be used which moves graph paper marked with a time base at a certain time rate and which will trace out the sawtooth waveform on this graph paper. The graph paper ordinarily used will have a time base marked off in hours and minutes and will be driven through the recorder at a rate such that a space marked off as one hour will pass the recording pen in one hour. Since a sawtooth waveform will be recorded for each millisecond difference between the two clocks, one can read directly from the graph, the amount of time consumed for a one millisecond difference. From this the amount of time gained or lost over a given period and the rate of running of the compared oscillator can be computed. It is also apparent that the slope of the recorded sawtooth waveform is equal to the acceleration of the compared clock over the reference clock. It is also apparent that this device will show the accumulated time difference between the two clocks over an extended period.

The recorder 26 can be powered from an ordinary 110 volt line and the time errors will be small enough to be neglected since the sawtooth which is traced out represents, for example, an accumulated time difference of one millisecond and the time taken to trace out the sawtooth may be on the order of hours. Thus a small variation of the time taken to record the sawtooth will have negligible effect upon the accuracy of frequency difference determinations or upon accumulated time differences.

The purpose of the phase shifter 14 is to provide a means for checking and adjusting the zero set and scale expansion of the recorder. With the phase shifter switched into the circuit the compared clock signal is shifted in phase through 360° which will cause a sawtooth waveform to be traced out on the graph paper of the recorder. It is necessary that equal amounts of the sawtooth be above and below the zero line of the graph paper which is located in the center of the paper, and if such is not the case, the variable resistor 162 may be adjusted to bring this condition about. Also the excursion of the sawtooth should extend from one edge of the graph paper to the other and the potentiometer 147 which determines the bias on the grid of tube 152 can be adjusted to bring this condition about.

If it is desired to have the recorder trace out a sawtooth waveform more frequently than once for every cycle difference between the compared and reference signals, an error multiplier as shown in FIG. 5 may be placed in the circuit and the two signals fed to this error multiplier before being applied to the input terminals 27 and 28 and input terminals 74 and 75. The reference signal of standard frequency 218 is fed to a multiplier 221 which, for example, multiplies the standard frequency by 9. The compared signal 222 which contains the reference frequency plus some error Δf is multiplied by a factor of 10, for example, by the multiplier 223, to give an output of ten times the standard frequency plus 10Δf. The output from multiplier 221 and the output from multiplier 223 are then applied to a mixer and filter 224 which produces an output of the standard frequency plus ten times the error Δf. The standard frequency signal from 218 is then applied to the input terminals 74 and 75 and the output of the mixer is applied to the input terminals 27 and 28 of FIG. 2. By use of this system the recorder will trace out ten sawtooth waveforms for each cycle difference between the frequency of the reference signal and the frequency of the signal to be compared. In terms of measuring the time deviation between precision clocks the sawtooth waveform will be traced out every .1 millisecond rather than every millisecond.

Thus the invention provides a high precision frequency measuring device which is capable of measuring very small frequency differences between two signals with great accuracy.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A device for measuring a relatively small difference in frequency between first and second independent sources of continuous electrical waves having fixed frequencies comprising, a pulse forming network for converting the waves from said first source to a series of pulses having a frequency equal to said second source plus "n" times the difference in frequency between said first and second sources, n being any integer, a mixing circuit means having at least two inputs and at least one output for deriving at said one output a resultant signal having a frequency equal to the difference in frequency between signals applied to said two inputs, said pulse forming network being connected to a first of said mixing circuit inputs, coupling means connecting a second of said mixing circuit inputs to said second source, and a time base recorder means connected to said one output for producing a record of the amplitude-vs.-time slope of said resultant signal.

2. A device in accordance with claim 1 wherein said coupling means includes a sawtooth generator synchronized with said second source with an output connected to the second of said mixing circuit inputs.

3. A device for measuring the frequency difference between first and second independent sources of electrical signals having fixed frequencies comprising, a first multiplier means for multiplying the frequency of said first source by a first integer, a second multiplier means for multiplying the frequency of said second source by a second integer, the difference between said integers being equal to 1, a first signal mixer having at least two inputs and a single output, a first of said first signal mixer inputs being connected to the first of said sources by said first multiplier means, the second of said first signal mixer inputs being connected by said second multiplier means to the second of said sources, a second signal mixer having at least two inputs and a single output, a filter tuned to the lowest frequency signal produced by said first signal mixer connecting the first of said second signal mixer inputs to the single output of said first signal mixer, a pulse generator having a frequency in synchronism with said first source connected to the second input of said second mixing circuit, and a time base recorder means connected to the single output of said second signal mixer for producing a record of the amplitude-vs.-time slope of said lowest frequency signal.

References Cited in the file of this patent
UNITED STATES PATENTS

| | | |
|---|---|---|
| 2,250,708 | Herz | July 29, 1941 |
| 2,335,265 | Dodington | Nov. 30, 1943 |
| 2,351,548 | Schwartz | June 13, 1944 |
| 2,423,103 | Koechlin | July 1, 1947 |
| 2,427,366 | Mozley et al. | Sept. 16, 1947 |
| 2,563,816 | Butman | Aug. 14, 1951 |
| 2,566,222 | Lynch | Aug. 28, 1951 |
| 2,615,943 | Gouriet | Oct. 28, 1952 |
| 2,732,496 | Slonczewski | Jan. 24, 1956 |
| 2,794,954 | Bischoff | June 4, 1957 |

FOREIGN PATENTS

| | | |
|---|---|---|
| 1,026,643 | France | Apr. 29, 1953 |